United States Patent [19]

Shirai et al.

[11] Patent Number: 4,738,283
[45] Date of Patent: Apr. 19, 1988

[54] GAS FLOW CONTROLLER

[75] Inventors: Shigeru Shirai; Yoshio Yamamoto; Yukio Nagaoka, all of Nara, Japan

[73] Assignee: Matsushita Electric Industrial Co. LTD., Osaka, Japan

[21] Appl. No.: 45,879

[22] Filed: May 4, 1987

[30] Foreign Application Priority Data

| May 8, 1986 [JP] | Japan | 61-105226 |
| May 8, 1986 [JP] | Japan | 61-105232 |
| May 16, 1986 [JP] | Japan | 61-112931 |
| May 21, 1986 [JP] | Japan | 61-116501 |

[51] Int. Cl.$^4$ ............................................. F16K 11/083
[52] U.S. Cl. ............................ 137/624.11; 137/625.3; 137/625.32
[58] Field of Search ................. 137/624.11, 624.18, 137/624.2, 487.5, 625.3, 625.32; 251/207, 129.04; 318/601

[56] References Cited

U.S. PATENT DOCUMENTS

| 944,026 | 12/1909 | Fowden | 137/625.32 |
| 2,763,289 | 9/1956 | Mueller | 137/625.32 X |
| 3,465,217 | 9/1969 | Kress | 318/601 |
| 4,313,529 | 2/1982 | Kato | 251/129.04 X |

FOREIGN PATENT DOCUMENTS 30-49137 of 1955 Japan.
59-21324 6/1984 Japan.

*Primary Examiner*—Alan Cohan
*Attorney, Agent, or Firm*—Stevens, Davis, Miller & Mosher

[57] ABSTRACT

In regulating a burning gas quantity of a gas combustion apparatus, a gas flow controller is used. The gas flow controller is constructed such that a closing member within a cock is rotated by using a motor. The closing member has a plurality of holes formed in the axial direction of the member and a plurality of grooves each corresponding to the hole and formed in the circumferential direction of the member. The cock is used for changing, opening and closing a plurality of orifice passageways. The motor is driven in accordance with a signal from a position determining unit which discriminates the position of the cock. The gas flow controller can advantageously ensure a high precision of gas flow, a high reduction ratio, and a low power consumption.

14 Claims, 15 Drawing Sheets

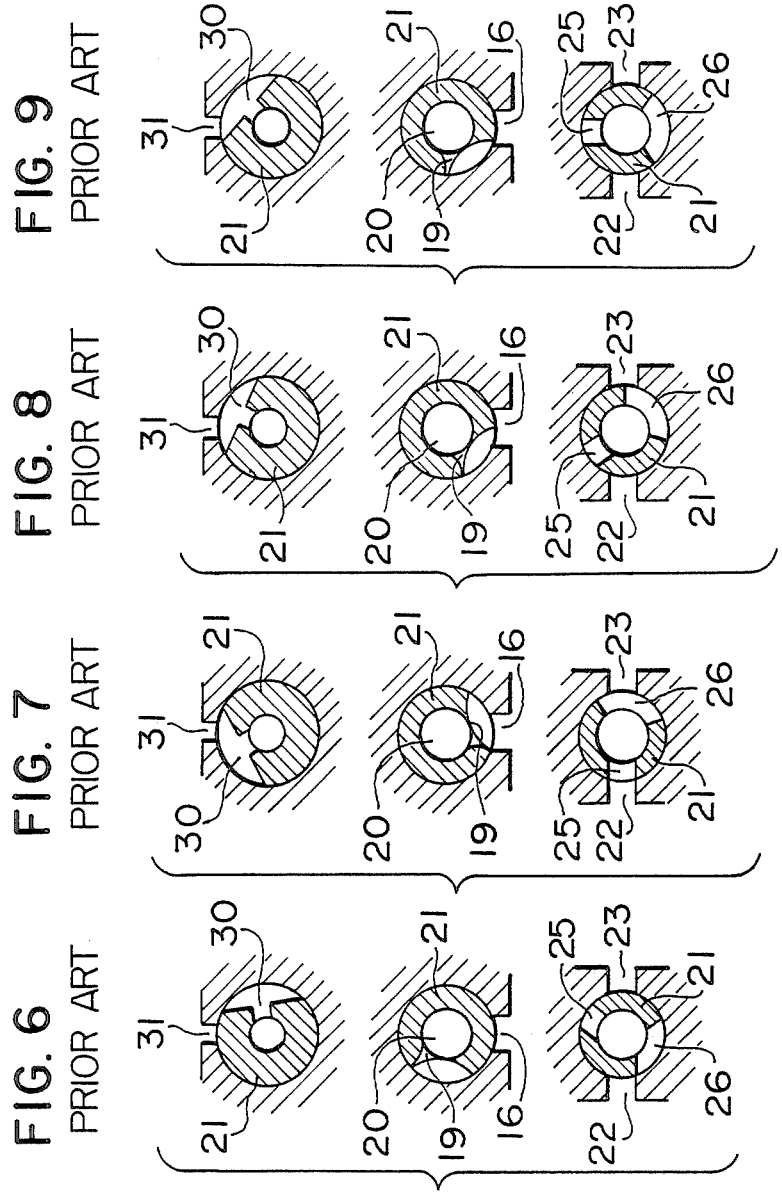

FIG. 10 PROIOR ART
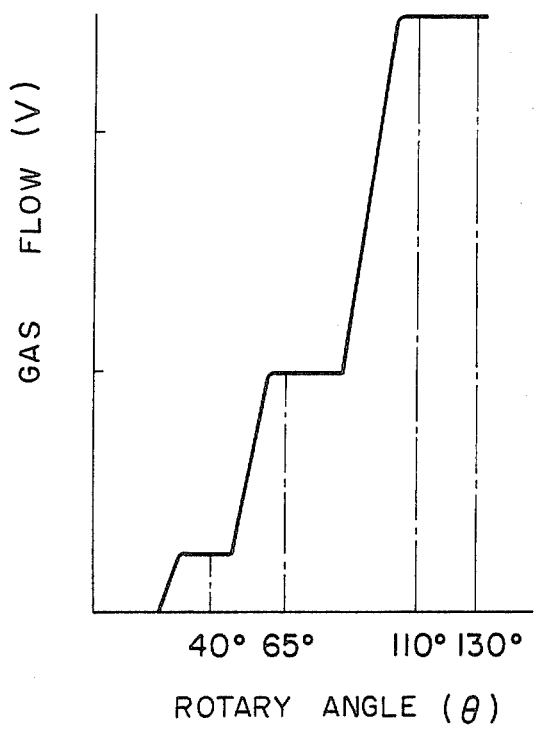

GAS FLOW CONTROLLER

BACKGROUND OF THE INVENTION

The present invention relates to a gas flow controller specifically driven by electrical means and used in controlling the burning quantity of fuel gas supplied to a cooking machine, a heater or a hot water supplier.

A gas flow controller is used in various applications which requires a control of the burning quantity of gas in accordance with the conditions of an object to be burnt. Recently, such a control is conducted through regulation of an electric quantity. A most simple but frequently used controller is a controller constructed of electromagnetic valves shown in FIG. 1. The controller comprises a plurality of electromagnetic valves 3 mounted in parallel to each other at a plurality of gas passageways 2 to a burner 1, and a plurality of orifices 4 each having a different diameter and connected in series to a corresponding electromagnetic valve. A maximum burning quantity is attained when all the electromagnetic valves 3 are opened, whereas a minimum burning quantity is attained when only the electromagnetic valve 3 having a smallest orifice 4 diameter is opened. The gas burning quantity can be stepwise changed between the maximum and minimum burning quantity in accordance with a combination of the plurality of electromagnetic valves 3. Obviously, a combustion stops when all the electromagnetic valves are closed.

An alternative example of a controller which successively changes a burning quantity is shown in FIG. 2. A valve opening 8 and a valve 9 are provided along a gas passageway 5 between an inlet 6 and an outlet 7. The valve is supported at its end on a diaphragm 10 to which a permanent magnet 11 is attached. An electromagnetic 14 consisting of a magnetic iron core 12 and an exciting coil 13 is mounted facing the permanent magnet 11. The gas flow entering to the gas passageway 5 is regulated in accordance with the quantity of electricity supplied to the exciting coil 13. Particularly, when a current flows through the exciting coil 13 such that the polarity of the magnetic core 12 causes a repulsion force to be generated against the permanent magnet 11, the valve 9 moves away from the valve opening 8 to allow the gas to flow. The gas pressure at the outlet 7 is determined by the repulsion force and the effective pressure receiving area of the diaphragm 10 so that the gas pressure applied to the burner at the downstream can be controlled in accordance with the quantity of electricity supplied to the exciting coil 13. Contrary to the above, the permanent magnet 11 attracts the magnetic iron core 12 when a current is not fed to the exciting coil 13. Therefore, if a soft elastic member 15 is provided on the surface of the valve 9, the gas flow can be stopped (see for example Japanese Unexamined Utility Model Publication No. 55-49137).

A further example of a controller with a manual cock which can multi-stepwise regulate a burning quantity is shown in FIGS. 3 to 10. In a gas cock main body 18 having a gas inlet 16 and a gas outlet 17, a closing member 21 is rotatably mounted which has a gas opening 19 at its side wall cooperating with the gas inlet 16 and a guide hole 20 formed in the axial direction of the closing member 21 and communicating with the gas opening 19. A first passageway 22 of a small reduction ratio, a second passageway 23 of a middle reduction ratio and a third passageway 24 with a large reduction ratio are formed in the cock main body 18 to communicate with the gas outlet 17 at their ends at the downstream. The ends of the first and second passageways 22 and 23 open at the upstream to the guide hole 20 via gas openings 25 and 26 formed at the side wall of the closing member 21, while the end of the third passageway 24 opens at its upstream to a chamber 27 at the bottom surface of the cock main body 18 which chamber communicates with the guide hole 20. Thus, the gas flow can be changed to three different steps (see for example Japanese Unexamined Utility Model Publication No. 59-21324).

In the above example, if a control shaft 28 is depressed, a pilot valve 29 opens. The guide hole 20 communicates with a pilot gas outlet 31 via the valve 29 and a gas opening 30 formed in the side wall at the downstream. A piezoelectric ignition device 32 cooperative with the control shaft 28 and a rotation display device 33 for visually recognizing a rotary position are mounted at the base of the control shaft 28.

The above conventional flow controllers have to be entirely been found not satisfactory. Particularly, the example shown in FIG. 1 requires a number of electromagnetic valves, resulting in a large size controller which is not suitable for mounting in other application apparatus. Further, since the total quantity of electricity becomes high when all the electromagnetic valves are opened, generation of heat affects the associated apparatus and a large and expensive power supply circuit is required. The controller shown in FIG. 2 has a limit in a ratio of a maximum flow to a minimum flow, i.e., a reduction ratio. A clearance at the valve opening 8 becomes extremely small with a part of the opening 8 being in contact with the valve 9, so that the reproducibility of a relationship between the electricity quantity and the supply gas pressure becomes unstable. Therefore, this controller is not suitable for practical application where an optional reduction ratio is needed. Further, the relationship between the electricity quantity and the gas pressure differs for each manufacture due to manufacture tolerance of permanent magnets and magnetic circuits, so that it has been necessary to set current values for maximum and minimum burning quantities at the time of manufacturing. In addition, since the pressure applied to the valve by the attraction force of the permanent magnet while a current is not fed is weak, a reliable airtight condition cannot be expected.

In the example shown in FIGS. 3 to 10, gas is introduced from the gas opening 19 formed at the side wall of the closing member 21, guided via the internal guide hole 20 to either the passageway 22, 23 at the side wall of the closing member 21 or the passageway 24 communicating with the bottom chamber 27 of the closing member 21, subjected to regulation of three, i.e., small, middle and large reduction ratios, and outputted from the gas outlet 17. Therefore, if the gas flow is required to be multi-stepwise regulated, for example, in five steps or six steps, it becomes necessary to use a large size closing member 21 with an increased diameter. Because of this reason or some other reasons, the controller of this example is not suitable for mass production and has too large an outer dimension to mount and assemble it in home appliances.

In FIGS. 6 to 9, the upper portions show sectional views of the member 21 taken along the line X—X, the middle portions show the sectional views taken along the line Y—Y, the lower portions show the sectional views taken along the line Z—Z, respectively of FIG. 4.

SUMMARY OF THE INVENTION

The present ivention aims to solve the above conventional problems and provide a flow controller which can obtain a high reduction ratio of gas flow and a high gas flow precision with a remarkably small electric power required for the operation.

A gas flow controller of this invention comprises a cock for changing, opening and closing a plurality of passageways provided in the gas path in parallel with each other; a perforated plate having a plurality of orifices corresponding to the plurality of passageways; a motor drive unit for driving to rotate the cock; a position determining unit having a position signal generator mounted on the shaft of the cock and a position judge circuit responsive to the position signal for judging a present position of the cock; and a drive control unit responsive to a target position signal and a present position signal from the position determining unit for sending a drive signal to the motor drive unit.

With the above construction of the gas flow controller of this invention, a plurality of passageways are changed, opened and closed by the cock which is rotated by a force from the motor drive unit. A combination of passageways through which a gas flows can be selected to a predetermined state in accordance with the cock stop position. The perforated plate having a plurality of orifices of different diameter is provided at the passageways. A desired combination of orifices of the perforated plate through which a gas flows is determined in accordance with the cock stop position, thus enabling to stepwise change from a maximum burning quantity to a minimum burning quantity. The reduction ratio is determined by orifice diameters so that any high reduction ratio can be designed as desired. Further, since the precision of gas flow is dependent only on orifice diameters, a high precision can be attained. The position determining unit used when stopping the cock always monitors a present position using the position signal generator mounted on the cock shaft, the present position including positions where the cock is to be stopped and other intermediate positions therebetween where the cock is not to be stopped. When a target position is to be changed due to a need of a change in burning quantity, the drive control unit sends a drive signal to the motor drive unit upon determining whether the cock is turned clockwise or counter-clockwise, by comparing a present position with the target position. When the target position and the present position become coincident, the drive signal is terminated to stop the cock. It takes only a short time to drive the motor drive unit, during which the gas burning quantity is to be changed. As a result, heat generation can be neglected and a power source is operated for a short time within its ratings. Thus it is possible to easily realize a power source of small size and light weight. Apparently, the operating time of the motor drive unit is considerably shorter than the burning time.

BRIEF DESCRIPTION OF THE DRAWINGS

FIGS. 6, 7, 8 and 9 are lateral cross sections of a cock with various rotary angle positions of the closing member shown in FIG. 4;

FIG. 10 is a graph showing a change in gas flow according to a prior art;

DESCRIPTION OF THE PREFERRED EMBODIMENTS

Figure 1:
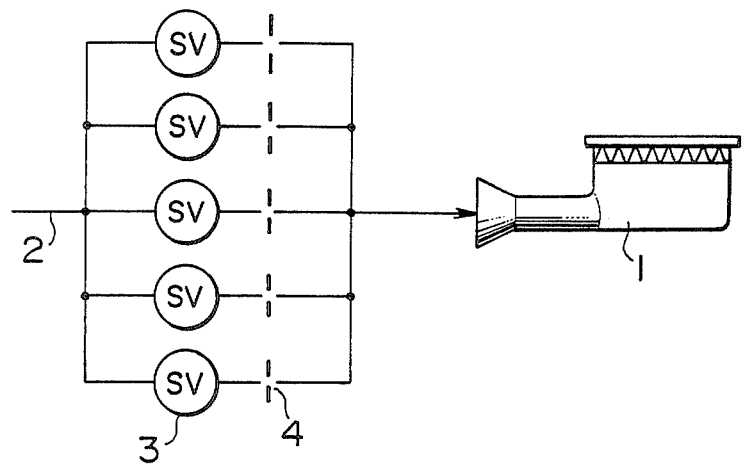
FIG. 1 is a schematic diagram showing a conventional gas flow controller.
Figure 2:
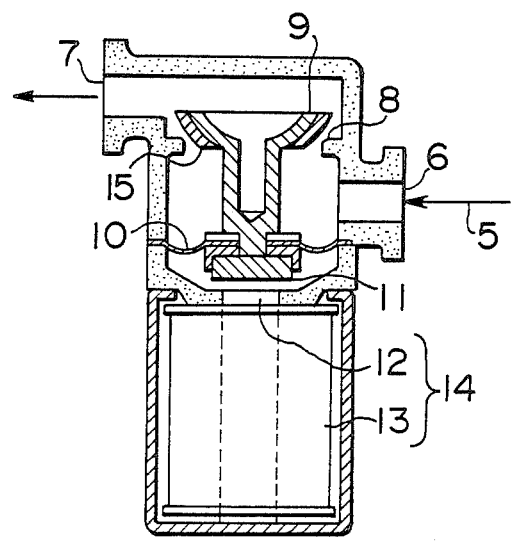
FIG. 2 is a cross section showing another conventional gas flow controller.
Figure 3:
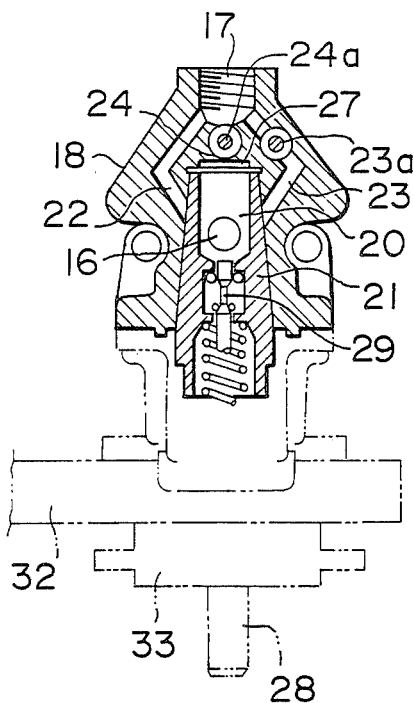
FIG. 3 is a view showing partially in section a conventional cock.
Figure 4:
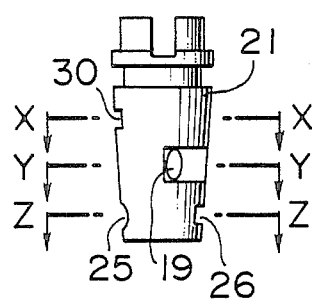
FIG. 4 is a front view of a conventional closing member.
Figure 5:
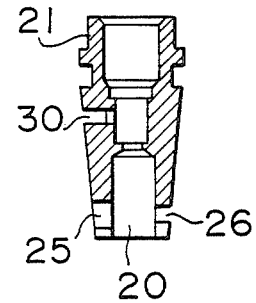
FIG. 5 is a vertical section of the closing member shown in FIG. 4.
Figure 11:
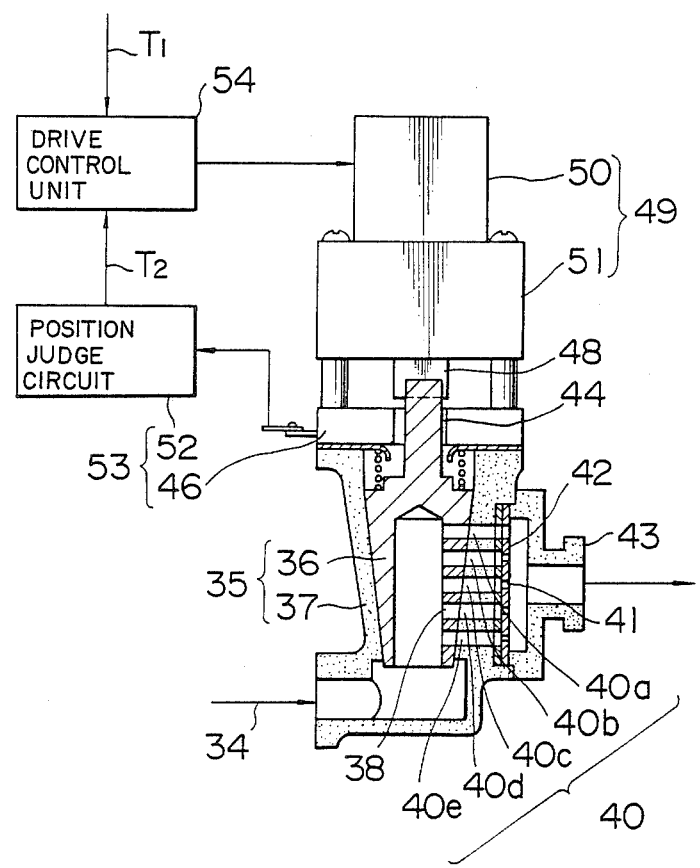
FIG. 11 is a cross section showing a main part of a first embodiment of the gas controller according to the invention.
Figure 12:
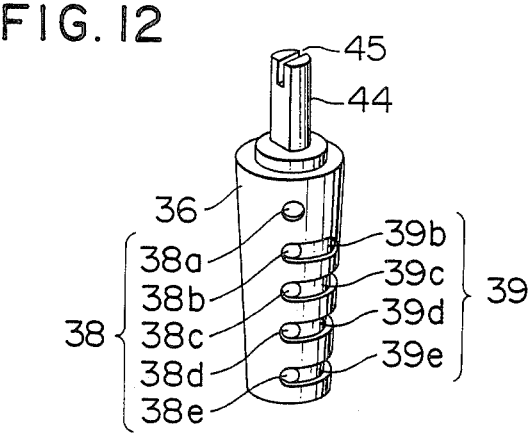
FIG. 12 is a perspective view of the closing member of the gas controller.
Figure 13:
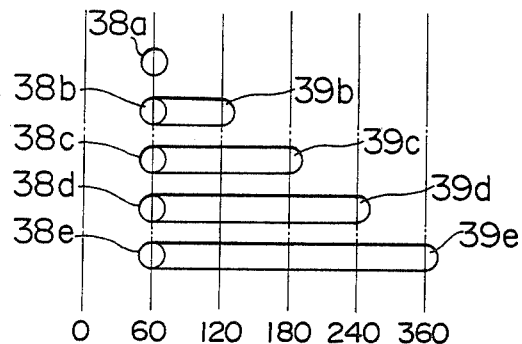
FIG. 13 is a developed view showing a positional relationship between holes and grooves of the closing member.
Figure 14:
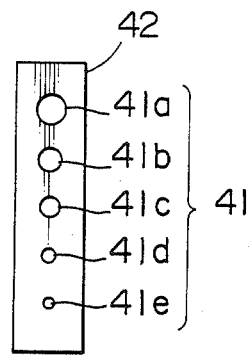
FIG. 14 is a plan view showing the perforated plate.
Figure 15:
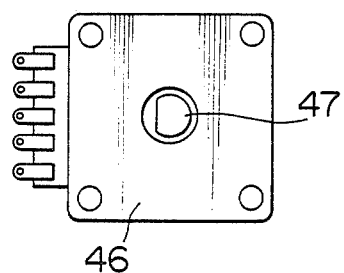
FIG. 15 is a plan view showing the position signal generator.
Figure 16:
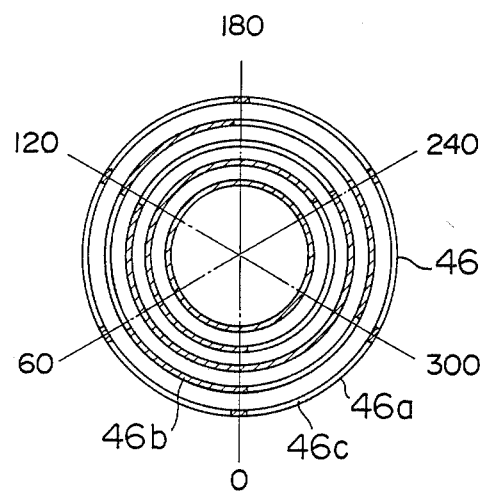
FIG. 16 shows a pattern of a slide contact surface of the absolute type encoder.

Next, the embodiments of the present invention will be described with reference to the accompanying drawings. Referring to FIG. 11, a cock 35 located at a gas passageway 34 is constructed of a closing member 36 rotating about a center axis thereof and a housing 37 provided outside the closing member 36. The closing member 36 has an outer appearance as shown in FIG. 12 and is formed with a plurality of holes 38a, 38b, 38c, 38d and 38e in its axial direction, and with grooves 39b, 39c, 39d and 39e of different length in its circumferential direction communicating with the corresponding holes. The holes 38 and grooves 39 are disposed having an angular relationship therebetween as shown in a developed view of FIG. 13. A plurality of passageways 40a, 40b, 40c, 40d and 40e are formed in the housing in its radial direction passing through the housing wall, the passageways each corresponding in height to each hole 38 of the closing member 36. At the outside ends of the passageways, a perforated plate 42 is mounted which is formed with orifices 41a, 41b, 41c, 41d and 41e of different diameter each corresponding to each of the plurality of passageways 40. The passageways are united at the downstream of the perforated plate 42 by a joint 43 to be coupled to a burner (not shown). FIG. 14 is a plan view of the perforated plate 42. The upper end portion of the closing member 36 is formed with a shaft 44 of a D-character shape in section as shown in FIG. 12, a straight slit 45 being formed at the end of the shaft 44. The D-character shape shaft 44 is inserted into a D-character shape hole 47 formed at the center of a rotary portion of a position signal generator 46 such as an encoder or a potentiometer as shown in FIG. 15. The shaft 44 is rotated by means of a motor drive unit 49 having an output shaft 48 which couples to the straight slit 45. The motor drive unit 49 is usually constructed of a motor 50 and a reduction gear box 51 for increasing torque. FIG. 15 shows an example of the position signal generator 46 using a 4 bit encoder which has a slide contact surface pattern as shown in FIG. 16. The rotary portion of the encoder rotating the shaft 44 has a slide brush extending in the radial direction. The slide brush rotates while maintaining a contact between the innermost circular contact surface and the other four outer circular contact surfaces 46b. Electrical contact between the innermost surface and each of the outer surface is enabled at the hatched portion and disabled at the other portion. Assuming that electrically enabled state is represented by "1" and disabled state by "0", the angles of the brush are represented, in the order from the innermost to the outermost, respectively by 1111 at 0 degree angle, 1110 at the intermediate portion of 0 degree angle and 60 degree angle, 1101 at 60 degree angle, 1100 at the intermediate portion of 60 degree angle and 120 degree angle, 1011 at 120 degree angle, 1010 at the intermediate portion of 120 degree angle and 180 degree angle, 1001 at 180 degree angle, 1000 at the intermediate portion of 180 degree angle and 240 degree angle, 0111 at 240 degree angle, 0110 at the intermediate portion of 240 degree angle and 300 degree angle, 0101 at 300 degree angle, and 0100 at the intermediate of 300 degree angle and 0 degree angle. The combination of these on/off signals changes as the closing member 36 rotates. It is assumed that the angle used in the developed view of the closing member shown in FIG. 13 are made coincide with those used in the encoder pattern shown in FIG. 16, and that position where the plurality of passageways 40 formed in the housing 37 are located is assumed as a position at 0 degree angle. Then, signal 1111 indicates a stop position of the cock 35, signal 1101 indicates a maximum burning quantity where gas flows through all the orifices 41 of the perforated plate 42, and after the burning quantity gradually decreases through signal 1011, 1001 to 0111, signal 0101 indicates a minimum burning quantity where gas flows only through the orifice 41e. The cock position is judged by a position determining unit 53 constructed of a position judge circuit 52 and the position signal generator 46, whereby the circuit 52 receives a signal from the generator 46 and compares the signal with bit signals stored beforehand. A target position signal T1 to be determined based on the conditions of a burning object or on a start or stop command, and a present position signal T2 from the position determining unit 53 are supplied to a drive control unit 54. The drive control unit 54 causes the motor 50 to turn in the direction that the target position signal T1 can be obtained. When the target position is obtained, power supply to the motor 50 is stopped.

With the above construction of the gas controller, the reduction ratio and the precision of gas flow at each rotary position of the cock is determined only by the diameter of each orifice 41 of the perforated plate 42. Therefore, a high reduction ratio and a high precision of gas flow can be readily obtained. If the gas flow is not needed to be changed, it is necessary to drive only the position determining unit 53, thus enabling a low power consumption. Specifically, the closing member can be stopped at a desired position without any error by mounting the absolute type encoder having a pattern as shown in FIG. 16. As a result, there is no fear of reduction in the burning quantity which might be caused when the holes 38 of the closing member 36 and the passageways 40 of the housing 37 become displaced when they are stopped. Thus, a margin of diameter of the holes 38 and passageways 40 through which gas flows is made as small as it is necessary, resulting in designing the closing member 36 with smaller diameter and length, and in addition decrease in output torque of the motor drive unit 49.

Figure 17:
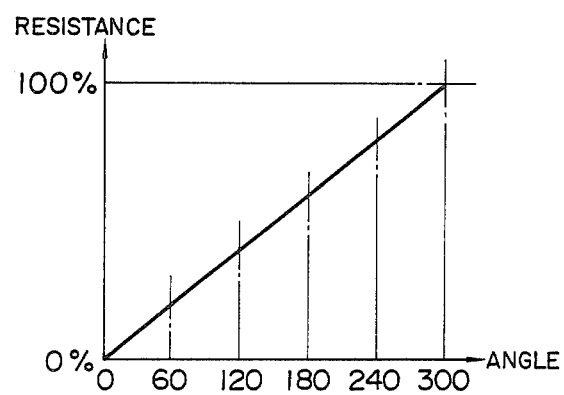
FIG. 17 is a graph showing the characteristics of another example of the position signal generator.

Another example of the position signal generator 46 used in this invention is shown in FIG. 17. In this example, a potentiometer is used which gives a resistance value proportional to a rotary angle thus indicating a present position of the closing member 36. With this method, the number of signal lines connecting the position signal generator 46 and the position judge circuit 52 is advantageously made small.

A single passageway is used ato the downstream of the plurality of passageways 40 as shown in FIG. 11. However, only a passageway extending through the orifice 41e of the perforated plate 42 may be disposed independently from the others to use it for a pilot burner.

The gas flow controller described so far in the above embodiment has an effect capable of attaining a high reduction ratio while retaining a precision of gas flow and reducing a power consumption as well as the following effects.

(1) The position determining unit consisting of the position signal generator and the position judge circuit is so constructed that a present position of the closing member can be obtained at any time when it becomes necessary. Therefore, a backup power supply or a capacitor is not needed as a measure of instantaneous power failure, contrary to the case where an incremental type encoder is used to estimate a present position by adding or subtracting the pulses corresponding in number to a deviation from a reference position. Further, it is not necessary to use an operating sequence which makes the encoder return to the reference position after recovery of a long time power failure, thus enabling to simplify the drive control unit.

(2) The position signal generator is constructed such that it can detect stop positions of the cock and the intermediate positions therebetween. Therefore, when the cock passes over the stop position because of the inertia of the motor drive unit, the position signal generator immediately detects that the cock has passed over the stop position, to drive it in the opposite direction. As a result, a high response speed to a change in gas flow can be obtained.

(3) Since the gas flow controller is constructed of a cock whose closing member is rotated, a high reliability at the stop position of the cock can be obtained.

Figure 18:
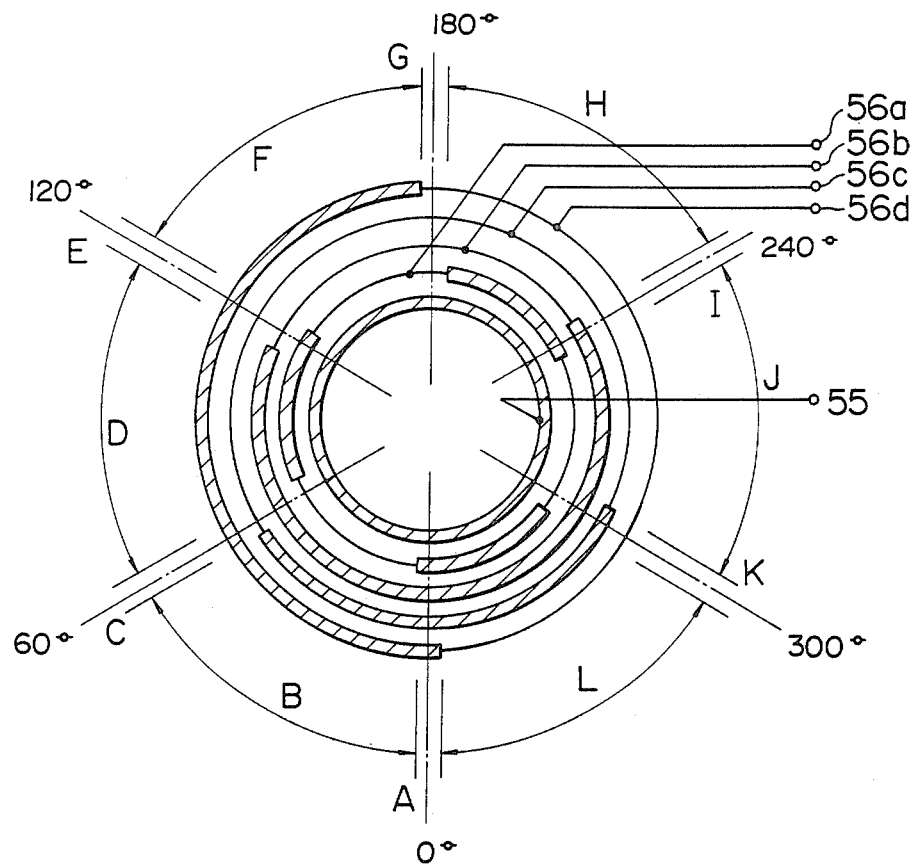
FIG. 18 shows a pattern of a slide contact surface of another absolute type encoder of the position signal generator.
Figure 19:
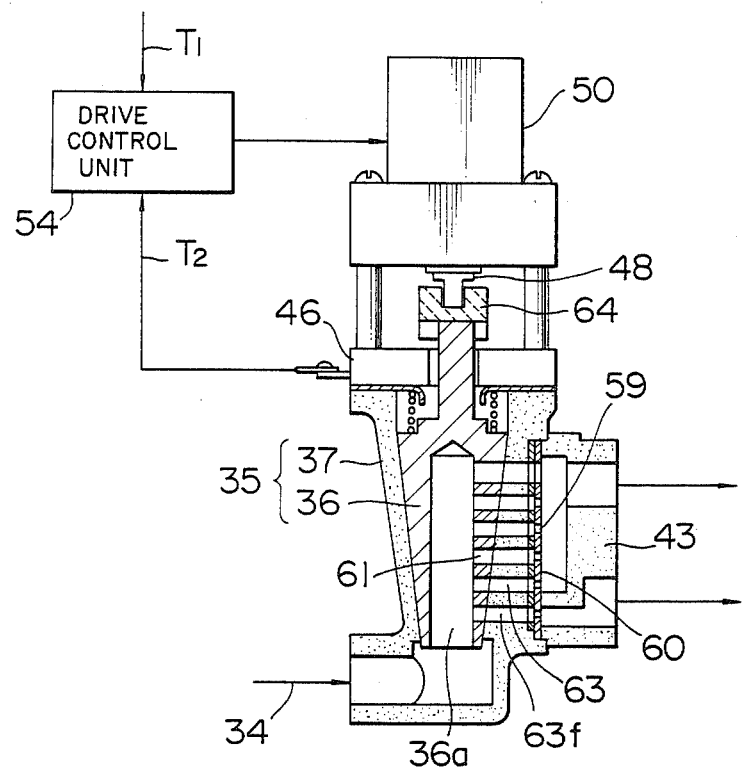
FIG. 19 is a cross section showing a main part of a second embodiment of the gas controller according to the present invention.
Figure 20A:
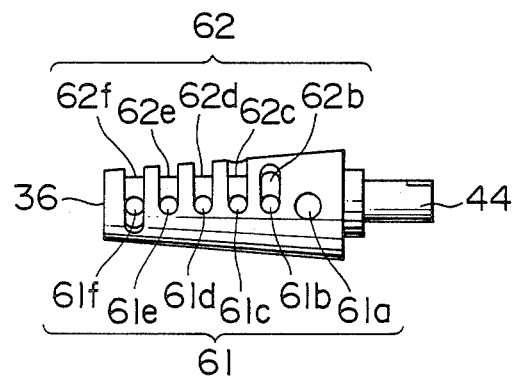
FIGS. 20A and 20B are front and side views of the closing member.
Figure 20B:
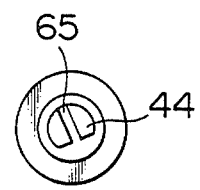

A still further example of the position signal generator 46 is shown in FIG. 18, wherein an absolute type encoder is used which can obtain a plurality of output signals respectively assigned to stop positions and intermediate positions of the cock, in the form of gray coded signals with respect to the rotary angle. The rotary portion of the encoder rotating the shaft 44 has a slide brush extending in the radial direction. The slide brush rotates while maintaining a contact between the innermost circular contact surface and the other four outer circular contact surfaces. Electrical contact between the innermost surface and each of the outer surfaces is enabled at the hatched portion and disabled at the other portion. The terminal connected to the innermost common contact surface is represented by reference numeral 55, other terminals connected to the outer contact surfaces are represented by reference numerals 56a, 56b, 56c and 56d in the order from the inner contact surface to the outer contact surface, and angular areas shown in FIG. 18 are represented by references A, B, C, D, E, F, G, H, I, J, K and L. Signals obtained between the common terminal and each outer terminal change as shown in Table 1, wherein it is assumed that electrically enabled state is represented by "1" and disabled state by "0".

TABLE 1

| Angle | 0° | | 60° | | 120° | | 180° | | 240° | | 300° | |
|---|---|---|---|---|---|---|---|---|---|---|---|---|
| Area | A | B | C | D | E | F | G | H | I | J | K | L |
| 56a-55 | 1 | 0 | 0 | 1 | 1 | 0 | 0 | 1 | 1 | 0 | 0 | 1 |
| 56b-55 | 1 | 1 | 1 | 1 | 0 | 0 | 0 | 0 | 1 | 1 | 1 | 1 |
| 56c-55 | 1 | 1 | 0 | 0 | 0 | 0 | 0 | 0 | 0 | 0 | 1 | 1 |
| 56d-55 | 1 | 1 | 1 | 1 | 1 | 1 | 0 | 0 | 0 | 0 | 0 | 0 |

As shown in Table 1, an output signal of the absolute type encoder changes its content by one bit when the area changes, thus obtaining gray coded signals. The combination of these four bit signals changes as the closing member 36 rotates. It is assumed that the angles used in the developed view of the closing member shown in FIG. 13 are made coincide with those used in the encoder pattern shown in FIG. 18, and that the position where the plurality of passageways 40 formed in the housing 37 are located is defined as a position at 0 degree angle. Then, signal 1111 indicates a stop position of the cock 35, signal 0101 indicates a maximum burning quantity where gas flows through all the orifices 41 of the perforated plate 42, and after the burning quantity gradually decreases through signal 1001, 0000, 1100, signal 0110 indicates a minimum burning quantity where gas flows only through the orifice 41e. The cock position is judged by a position determining unit 53 constructed of a position judge circuit 52 and the position signal generator 46 whereby the circuit 52 receives a signal from the generator 46 and compares the signal with bit signals stored beforehand. A target position signal T1 to be determined based on the conditions of a burning object or on a start or stop command, and a present position signal T2 from the position determining unit 53 are supplied to a drive control unit 54. The drive control unit 54 causes the motor 50 to turn in the direction that the target position signal T1 can be obtained. When the target position is obtained, power supply to the motor 50 is stopped.

With the above construction of the gas controller, the reduction ratio and the precision of gas flow at each rotary position of the cock is determined only by the diameter of each orifice 41. Therefore, a high reduction ratio and a high precision of gas flow can be readily obtained. If the gas flow is not needed to be changed, it is necessary to drive only the position determining unit 53, thus enabling a low power consumption. Specifically, the closing member can be stopped at a desired position without any error by mounting the absolute position type encoder having a pattern as shown in FIG. 18. As a result, there is no fear of reduction in the burning quantity which might be caused when the holes 38 of the closing member 36 and the passageways 40 of the housing 37 become displaced when they are stopped. Thus, a margin of diameters of the holes 38 and passageways 40 through which gas flows is made as small as it is necessary, resulting in designing the closing member 36 with smaller diameter and length, and in addition decrease in output torque of the motor drive unit 49.

A single passageway is used at the downstream of the plurality of passageways 40 as shown in FIG. 11. However, only a passageway extending through the orifice 41e may be disposed independently from the others to use it for a pilot burner.

The gas flow controller described so far in the above embodiment has an effect capable of attaining a high reduction ratio while retaining a precision of gas flow and reducing a power consumption, as well as the following effects.

(1) The position signal generator generates gray coded output signals. Therefore, a chattering, if any, at the time when a position signal changes between a stop position and the other position near the stop position, is suppressed to a one-bit change. Thus, the signal from the position signal generator becomes one of the two signals before and after the change, and there is no fear that the position judge circuit judges the cock position as far apart from the correct one. This is particularly important for the gas flow controller since an over-heating which is caused by an excessive gas supply can be avoided, and a risk of emitting a gas when it must be stopped can be avoided.

(2) The position signal generator is constructed such that it can detect stop positions of the cock and the intermediate positions therebetween. Therefore, when the cock passes over the stop position because of the inertia of the motor drive unit, the position signal generator immediately detects that the cock has passed over the stop position, to drive it in the opposite direction. As a result, a high response speed to a change in gas flow can be obtained.

A second embodiment of the gas flow controller is shown in FIGS. 19 to 23. The position signal generator in the second embodiment uses an absolute type encoder which can obtain a plurality of output signals respectively assigned to stop positions and intermediate positions of the cock. The gist of the position signal generator of this embodiment resides in that only the intermediate areas before and after the completely closed position are each divided and output signals from the position signal generator are assigned to those divided areas. Similar elements to those shown in FIGS. 11 to 16 of the first embodiment have been designated using identical reference numerals, and the detailed description therefor is omitted.

Figure 24:
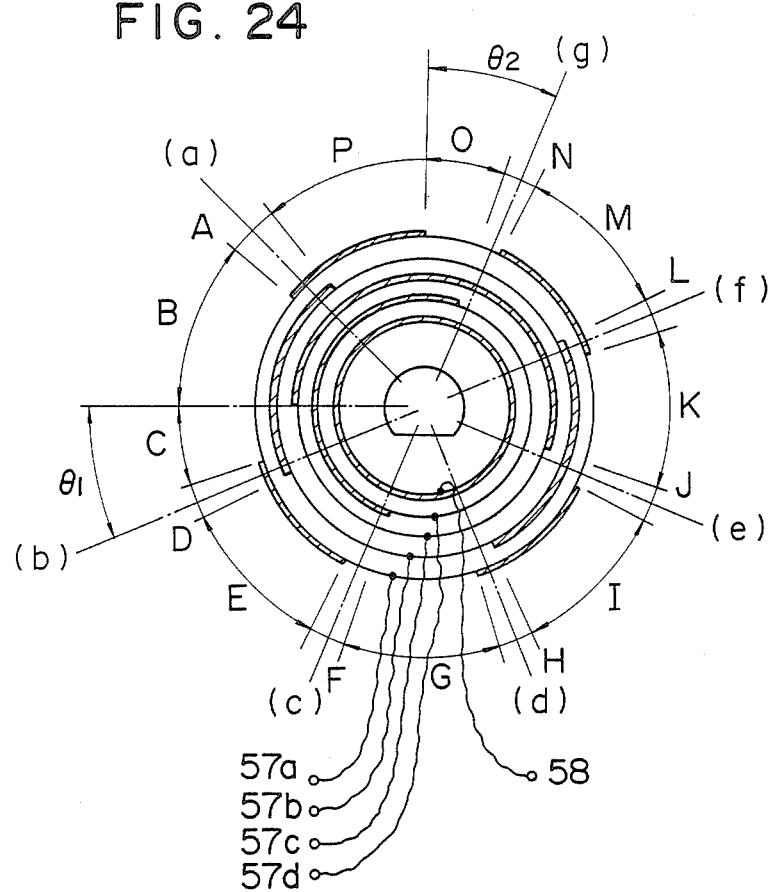
FIG. 24 shows a pattern of a slide contact surface of the absolute type encoder.

In the position signal generator 46, the rotary portion of the absolute type encoder with a pattern as shown in FIG. 24 has a slide brush extending in the radial direction. The slide brush rotates while maintaining a contact between the innermost common circular contact surface and the other four outer circular contact surfaces. In FIG. 24, electrical contact between the innermost surface and each of the outer surfaces is enabled at the hatched thick portion and disabled at the other portion. The common terminal connected to the innermost common contact ring is represented by reference numeral 58, other terminals connected to the outer contact rings are represented by reference numerals 57a, 57b, 57c and 57d. Four bit output signals composed of contact enabling bits and disabling bits at each angular position shown in FIG. 24 are shown in Table 2, wherein it is assumed that electrically enabled state is represented by "1" and disabled stage by "0".

TABLE 2

| Angle | (a) | | (b) | | (C) | | (d) | | (e) | | (f) | | (g) | |
|---|---|---|---|---|---|---|---|---|---|---|---|---|---|---|
| Area | A | B | C | D | E | F | G | H | I | J | K | L | M | N | O | P |
| 57a-58 | 1 | 0 | 0 | 1 | 1 | 0 | 0 | 1 | 1 | 0 | 0 | 1 | 1 | 0 | 0 | 1 |
| 57b-58 | 1 | 1 | 1 | 1 | 0 | 0 | 0 | 0 | 1 | 1 | 1 | 1 | 0 | 0 | 0 | 0 |
| 57c-58 | 1 | 1 | 0 | 0 | 0 | 0 | 0 | 0 | 0 | 1 | 1 | 1 | 1 | 1 | 1 | 1 |
| 57d-58 | 1 | 1 | 1 | 1 | 1 | 1 | 0 | 0 | 0 | 0 | 0 | 0 | 0 | 1 | 1 | 1 |

Figure 21:
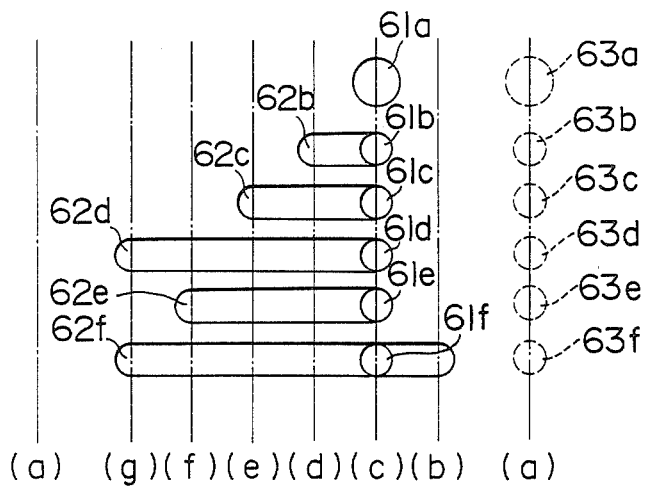
FIG. 21 is a developed view showing the positional relationship between the holes and grooves of the closing member and the passageways formed in the housing.
Figure 22:
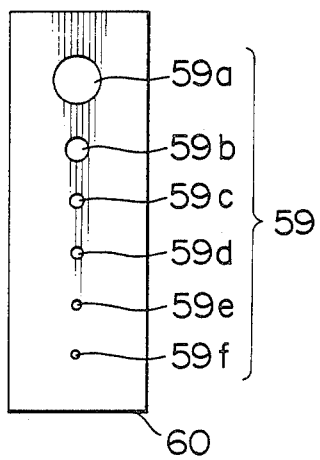
FIG. 22 is a plan view of the perforated plate.

References (a) to (b) indicating angles in Table 2 and FIG. 24 correspond to those (a) to (g) shown in FIG. 21. Assuming that the closing member is positioned at angle (a) shown in FIG. 21 and that the slide brush of the position signal generator 46 is at the area A, signal 1111 is obtained. As the slide brush rotates in the counter-clockwise direction and comes within the area D, gas flows only through the orifice 59f to a pilot burner. In this case, signal 1101 is obtained. Next at the area F, gasses flow through all the orifices 59a, 59b, 59c, 59d, 59e and 59f to enter a maximum burning state with signal 0001 being obtained. The slide brush further rotates and the combination of orifices in the perforated plate changes, and at angle (g) it takes a minimum burning state with signal 0010 being obtained. The arrangement of the orifices 59a, 59b, 59c, 59e and 59f, through the passageways 63a, 63b, 63c, 63d, 63e and 63f in the housing 37 to the holes 61a, 61b, 61c, 61d, 61e and 61f or the grooves 62a, 62b, 62c, 62d, 62e and 62f of the closing member 36, is similar to that shown in FIG. 11.

Figure 25A:
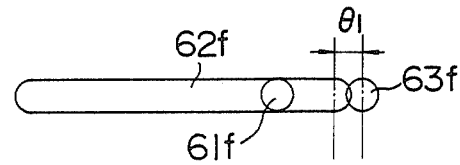
FIGS. 25A and 25B are a view showing a relationship between the passageways and the closing member grooves at the upstream and downstream of the completely closed position of the cock.
Figure 25B:
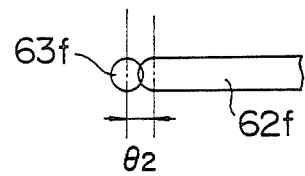

Different output signals are assigned to areas C and B which are divided at angle θ1 as shown in FIG. 24. The angle θ1 is an angle at which the pilot burner is extinguished if the closing member is rotated in the clockwise direction from the angle (b) to reduce the overlapping area between the groove 62f and the passage way 63f as shown in FIG. 25 (a). Similarly, areas P and O are divided at angle θ2 at which the pilot burner or the main burner is extinguished if the closing member is rotated in the counter-clockwise direction from the angle (g). Thus, two different output signals are obtained as the closing member is rotated from the angle (g) toward the non-burning state.

The relationship between the output signal patterns and the burning quantity at each position of the closing member is stored beforehand in the drive control unit 54. A target position signal to be determined based on the conditions of a burning object or on a start or stop command, and a present position signal from the position determining unit 46 are compared with each other to drive the motor drive unit 49 so as to rotate the motor in the direction that the target position signal can be obtained. When the target position is obtained, power supply to the motor is terminated.

Figure 23A:
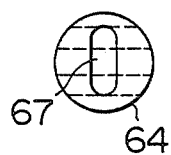
FIGS. 23A and 23B are front and side views of the coupling shaft.
Figure 23B:
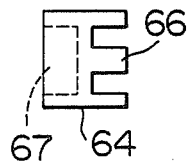

FIGS. 23A and 23B show a coupling shaft 64 which is formed with a convex portion 66 which is inserted into a groove 65 provided at the end of the closing member 36 and with a concave groove 67 at the opposite end into which the output shaft 48 of the motor drive unit 50 is inserted, the convex portion 66 and the concave groove 67 being disposed perpendicularly to each other.

The operating reliability of a gas combustion apparatus is important especially neat at the completely closed position of the cock, e.g., the ignition device be actuated simultaneously with the start of flowing a gas, or the closing member must completely stop the flow of gas when the combustion apparatus is stopped. In accordance with the construction of this invention, two different position signals are provided respectively before and after the completely closed position. The two different signals are divided at the position just before the burner is extinguished. Therefore, if the closing member is erroneously rotated in the clockwise direction from the area D instead of the counterclockwise direction, then a signal representative of the area C and also a signal representative of the area D are outputted to detect an erroneous rotation. Thus, the erroneous operation can be detected two times to accordingly correct the rotation of the closing member in the correct direction without extinguishing the burner. This is also applicable to the case where the closing member is erroneously rotated toward the completely closed position from the area N. This double check of the closing operation effectively improves the reliability.

The gas flow controller described so far in the above embodiment has an effect capable of attaining a high reduction ratio while retaining a precision of gas flow and reducing a power consumption, as well as the following effect.

(1) Since different signals can be obtained respectively before and after the completely closed position, advantageously an erroneous extinguishing operation can be avoided. Further, a check can be effected if the ignition device or other associated devices to be actuated when the closing member is rotated toward an open position. Thus, realiability of a function of preventing emission of a raw gas can be improved, which function is a most important for the safety operation of the burner.

Figure 26:
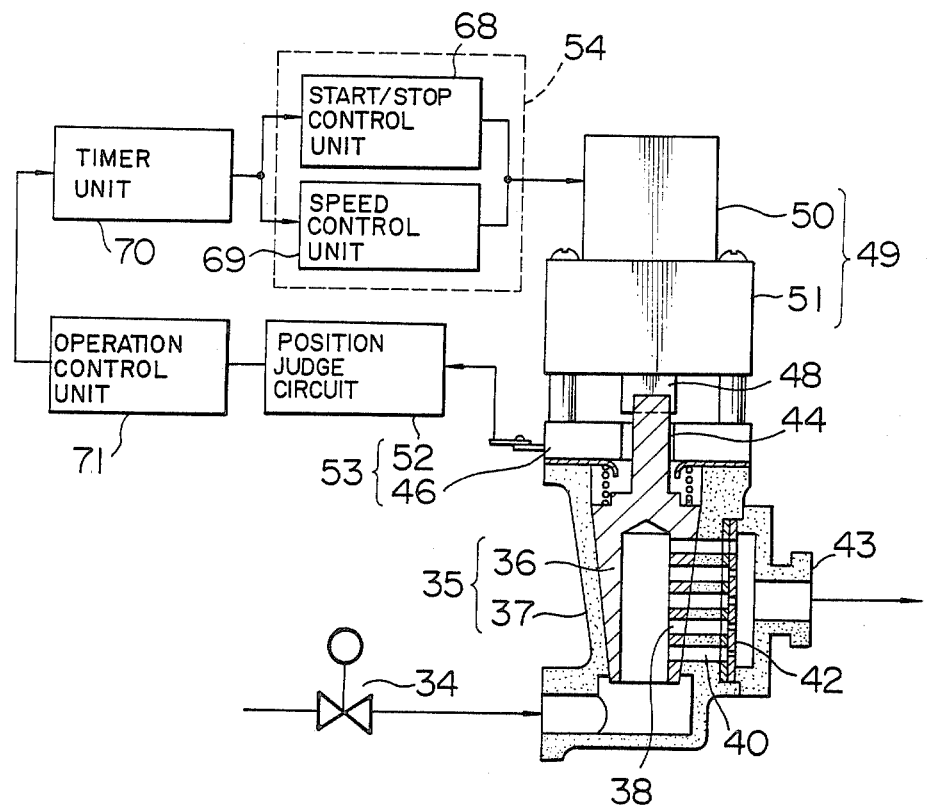
FIG. 26 is a cross section showing a main part of a third embodiment of the gas controller according to the present invention.
Figure 27:
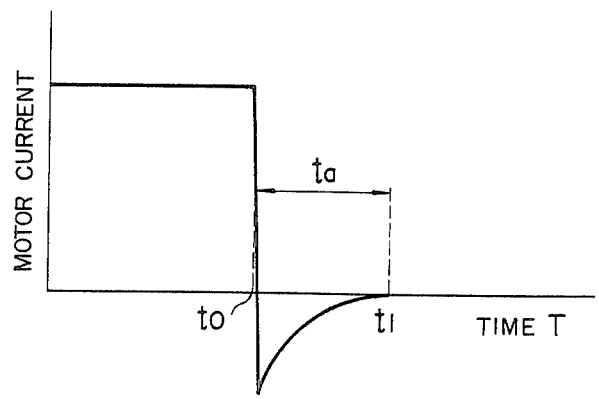
FIG. 27 is a graph showing the characteristics of current at the time the motor stops.

A third embodiment of the gas flow controller of this invention is shown in FIGS. 26 and 27. The gas flow controller comprises an operation control unit 71 responsive to a target position signal of a cock and a signal from cock position determining unit 53; a drive control unit 54 responsive to the operation control unit 71 for outputting a drive signal to a motor drive unit 49; and a timer unit 70 used in outputting a drive stop signal when the motor drive unit 49 is actuated to turn back the motor and outputting a reverse signal after a predetemined time lapse.

Referring to FIG. 26, if a target position opposite in direction is indicated during operation of the motor drive unit 49, the motor 50 is instantaneously stopped by means of a start/stop control unit 68. It takes some time for the motor 50 to fully stop after an instant stop signal is outputted. As shown in FIG. 27, a time ta required for the motor to stop is a time from the delivery of an instant stop signal (at time T=t0) to the stop time (of T=t1), as illustrated in the graph of a motor current shown in FIG. 27. The time unit 70 is set at a time longer than the time ta. A stop signal is outputted from the start/stop control unit 68 when the motor is rotated in the opposite direction. Thereafter, a predetermined time is allowed to lapse to output a reverse signal from the start/stop control unit 68.

The gas flow controller described so far in the above embodiment has an effect capable of attaining a high reduction ratio while retaining a precision of gas flow and reducing a power consumption, as well as the following effects.

(1) Since a reverse signal is outputted after a predetermined time lapse after a stop signal is outputted for instantaneous reverse rotation, an excessive current of the motor to be caused at the instantaneous reverse rotation can be avoided, thus enhancing the durability of the motor.

(2) It is possible to reduce impact load applied to the reduction gear train during reverse rotation, thus enhancing the reliability and durability of the reduction gear train.

Figure 28:
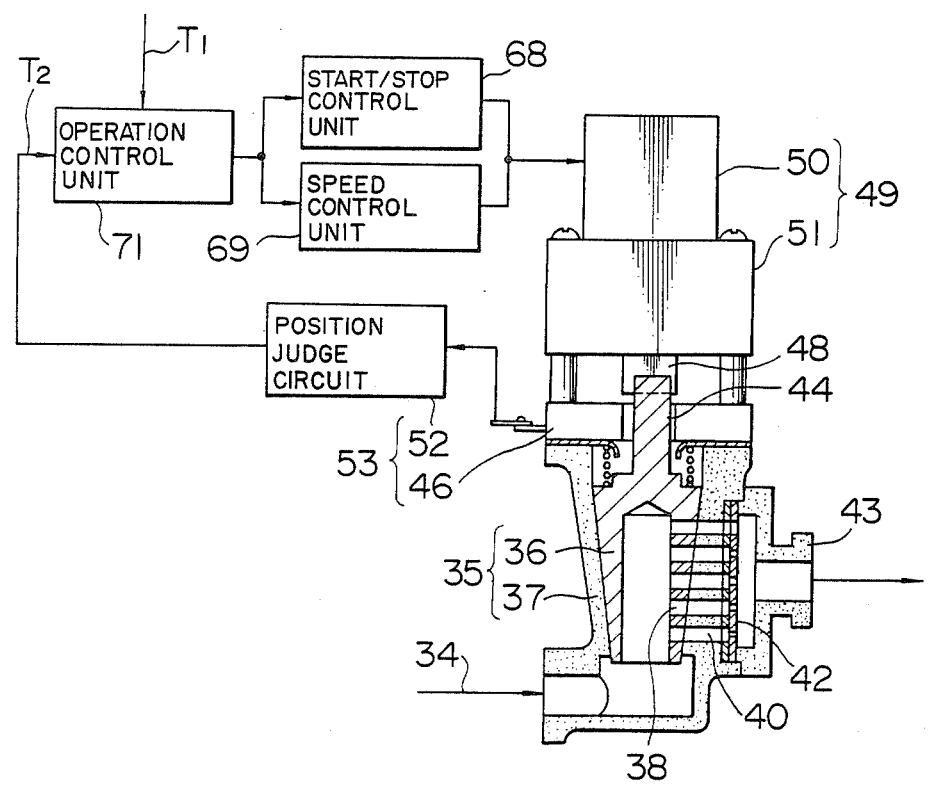
FIG. 28 is a cross section showing a main part of a fourth embodiment of the gas controller according to the present ivention.
Figure 29:
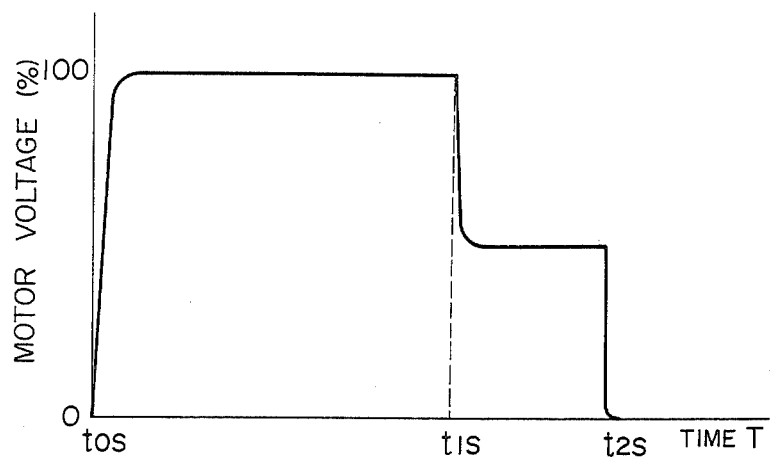
FIG. 29 is a graph used for illustrating the control operation of the gas controller.

A fourth embodiment of the present invention is shown in FIGS. 28 and 29. The gas flow controller comprises an operation control unit 71 responsive to a target position signal T1 of the cock and a present position signal T2 from a position determining unit 53; a speed control unit 69 responsive to a signal from the operation control unit 71 for regulating the speed of the motor through the motor drive unit 49; and a start/stop control unit 68 for starting and stopping the motor through the motor drive unit 49.

Referring to FIG. 28, the cock position is judged by a position determining unit 53 constructed of a position judge circuit 52 and the position signal generator 46 whereby the circuit 52 receives a signal from the generator 46 and compares the signal with bit signals stored beforehand. A target position signal T1 to be determined based on the conditions of a burning object or on a start or stop command, and a present position signal T2 from the position determining unit 53 are supplied to the operation control unit 71. The start/stop control unit 68 receives a signal from the operation control unit 71 to control the start/stop and rotation direction of the motor 50. The speed control unit 69 changes a supply power to the motor to regulate its rotation speed.

Next, the control operation for the motor 50 will be described. The description is directed to the case where the closing member is rotated from 0 degree angle (code 1111) to 120 degree angle (code 1011) in the pattern shown in FIG. 16. As a command for moving the closing member from 0 degree angle to 120 degree angle issues, the command including information of a clockwise rotation when seen in FIG. 16 and a maximum supply voltage is delivered to the start/stop control unit 68 and the speed control unit 69. The motor 50 is supplied with a maximum power immediately after time T=ts as shown in FIG. 29, thus ensuring a rapid starting response regardless of a high load at the starting of energizing the motor 50. A minimum drive time during which the motor is driven at the maximum power is previously set by the operation control unit 71. The code detected from the position signal generator 46 changes as the motor 50 rotates. When the closing member reaches the intermediate position (code 1100) between 60 degree angle and 120 degree angle in FIG. 16, the power supply to the motor 50 is reduced as shown at time T-t1s in FIG. 29 under the control of the speed control unit 69 to thus reduce the rotation speed of the motor 50. When the closing member is caused to reach 120 degree angle (code 1011) by the motor 50 rotating at this reduced speed, a power supply to the motor 50 is terminated by means of the start/stop control unit 68 and simultaneously therewith, the terminals across the motor is shortened to effect a damping operation and instantaneously stop the motor 50 at time T=t2s as shown in FIG. 29. Since the motor has been subjected to a reduced speed, it can be stopped instantaneously with a slight overriding angle. Thus, it is possible to determine the stop position within the angle range defined by the code 1011, thus ensuring a stable and precise gas flow.

The gas flow controller described so far in the above embodiment has an effect capable of attaining a high reduction ratio while retaining a precision of gas flow and reducing a power consumption, as well as the following effects.

(1) The speed of the motor is reduced upon reception of a code signal immediately before the target position to stop the motor instantaneously at the target position. Therefore, a high position determining precision of the closing member of the cock can be obtained, thus ensuring a high precision control of gas flow.

(2) Since a maximum power is supplied to the motor for a predetermined period at the starting of energizing the motor, a sufficient torque and rotation speed can be ensured even at a high load at the starting of energizing the motor.

(3) The position signal generator is so constructed that the cock stop positions and intermediate positions can be detected. Therefore, even if the closing member passes over the stop position due to the inertia of the motor drive unit, it is immediately detected and the motor can be rotated in the opposite direction. As a result, a high response speed can be obtained as the gas flow is changed.

Figure 30:
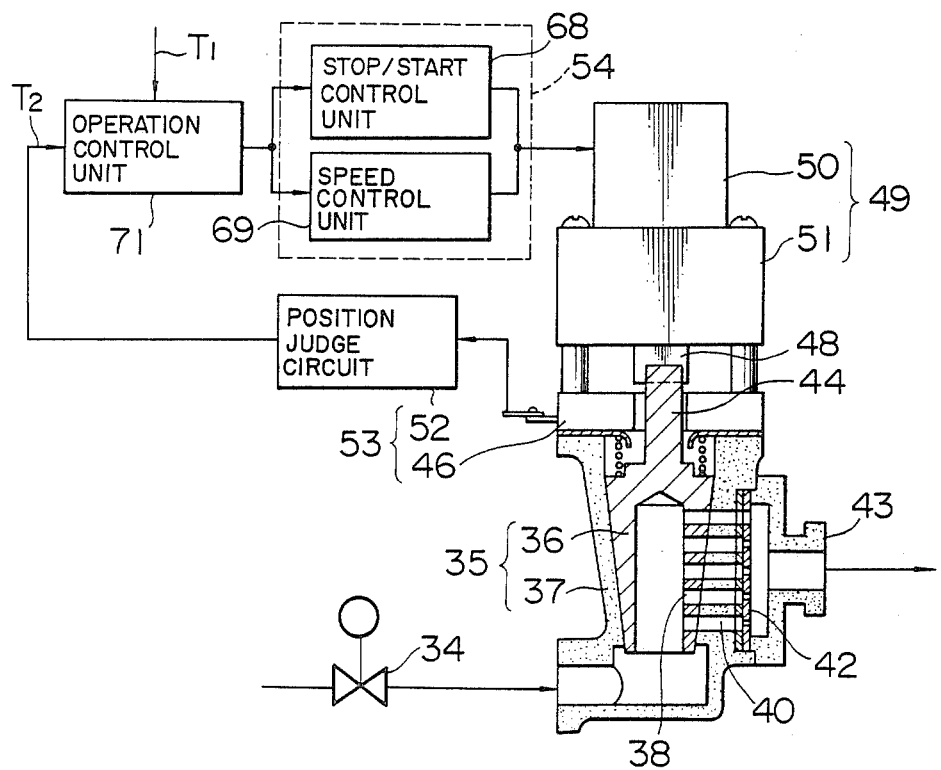
FIG. 30 is a cross section showing a main part of a fifth embodiment of the gas controller according to the present invention.

A fifth embodiment of the present invention is shown in FIG. 30. The gas flow controller comprises a position signal generator 46 for outputting a signal corresponding to a cock position; a position determining unit 53 responsive to the signal from the position signal generator for determining the cock position; an operation control unit 71 storing the order of occurrence of position signals for judging if a position signal is correct or not based on a target position signal T1 and a signal T2 from the position determining unit 53; and a drive control unit 54 responsive to the signal from the operation control unit 71 for controlling the motor drive unit 49.

Referring to FIG. 30, the position determining unit 53 always monitors a present position using the position signal generator 46 mounted on the cock shaft, the present position including positions where the cock is to be stopped and other intermediate positions where the cock is not to be stopped. When a target position is to be changed due to a need of a change in burning quantity, the operation control unit 71 sends a drive signal to the motor drive unit 49 via the drive control unit 54 upon determining whether the cock is turned clockwise or counter-clockwise, by comparing a present position with the target position. The cock position is always monitored by the position determining unit 53 which receives a signal from the position signal generator 46. When the cock reaches a target position, the motor drive unit 49 is disabled. Thus, the gas flow is stepwise changed. The operation control unit 71 stores the order of occurrence of position signals. Therefore, the operation control unit 71 can estimate a next signal based on a present position signal, the target position signal and the rotation direction, to thereby determine if the signal continuously sampled from the position determining unit 53 is correct or not. If the signal is not correct, the motor drive unit 49 is actuated to reduce the speed of the motor or stop it. Then, the signal is again checked if it is correct to detect an abnormal state.

The operation of detecting an abnormal state by using the position signal generator will be described in more detail. The description is directed to the case where the closing member is rotated from 0 degree angle (code 1111) to 120 degree angle (code 1011) is the pattern shown in FIG. 16. As a command for moving the closing member from 0 degree angle 120 degree angle issues, the command including information of a clockwise rotation when seen in FIG. 16 and a maximum supply voltage is delivered to the start/stop control unit 68 and the speed control unit 69. The order of occurrence of position signals as shown in the pattern of FIG. 16 is stored in the operation control unit 71 so that a code to be next detected can be estimated based on the target position, the present position and the rotation direction. A present code is 1111 at the start of energizing the motor and an estimated next code is 1110. Therefore, if a code other than 1111 or 1110 is generated from the position signal generator 46 at the star of energizing the motor, it can be considered that an abnormal state is present. If an abnormal signal is detected, the operation control unit 71 sends a speed reduction signal to the speed control unit 69 to reduce the speed of the motor 50 to again check the signal code. If the abnormal signal has been caused by temporary noises, then the abnormal signal will become a normal signal in most cases during the above check procedure. If it is decided as a normal signal, the motor 50 resumes a normal speed. If it is decided as an abnormal signal during the check procedure, the operation control unit 71 sends a stop signal to the start/stop control unit 68 to stop the motor 50. Thereafter, the signal code is again checked and if it is an abnormal signal, a gas open/close valve 34 is closed to stop gas supply and an abnormal state is notified using a buzzer (not shown) for example. The signal from the position signal generator 46 is checked while the speed of the motor is reduced. The reason for this is that since the position signal generator 46 such as an encoder or a potentiometer is likely to generate noises while it rotates at high speed, such a check is conducted while it rotates at low speed or after it stops, to thereby eliminate an erroneous check caused by temporary noises.

If a normal operation continues without detecting an abnormal signal, the code detected from the position signal generator 46 changes as the motor 50 rotates. When the closing member reaches the intermediate position (code 1100) between 60 degree angle and 120 degree angle in FIG. 16, the power supply to the motor 50 is reduced under control of the speed control unit 69 to thus reduce the rotation speed of the motor 50. When the closing member is caused to reach 120 degree angle (code 1011) by the motor 50 rotating at this reduced speed, a power supply to the motor 50 is terminated by means of the start/stop control unit 68 and simultaneously therewith, the terminals across the motor is shortened to effect a damping operation and instantaneously stop the motor 50. Since the motor has been subjected to a reduced speed, it can be stopped instantaneously with a slight overriding angle. Thus, it is possible to determine the stop position within the angle range defined by the code 1011, thus ensuring a stable and precise gas flow.

The gas flow controller described so far in the above embodiment has an effect capable of attaining a high reduction ratio while retaining a precision of gas flow and reducing a power consumption, as well as the following effects.

(1) The order of signals from the position signal generator is stored to estimate a next signal based on a target position, a present position and a rotation direction. The estimated signal is used for checking if the signal from the position signal generator is correct. Thus, an abnormal signal can be detected to avoid an erroneous operation and ensure a high reliability.

(2) The motor is reduced in speed or stopped to check again the detected abnormal signal from the position signal generator. Therefore, an erroneous operation caused by temporary noises can be avoided.

Figure 31:
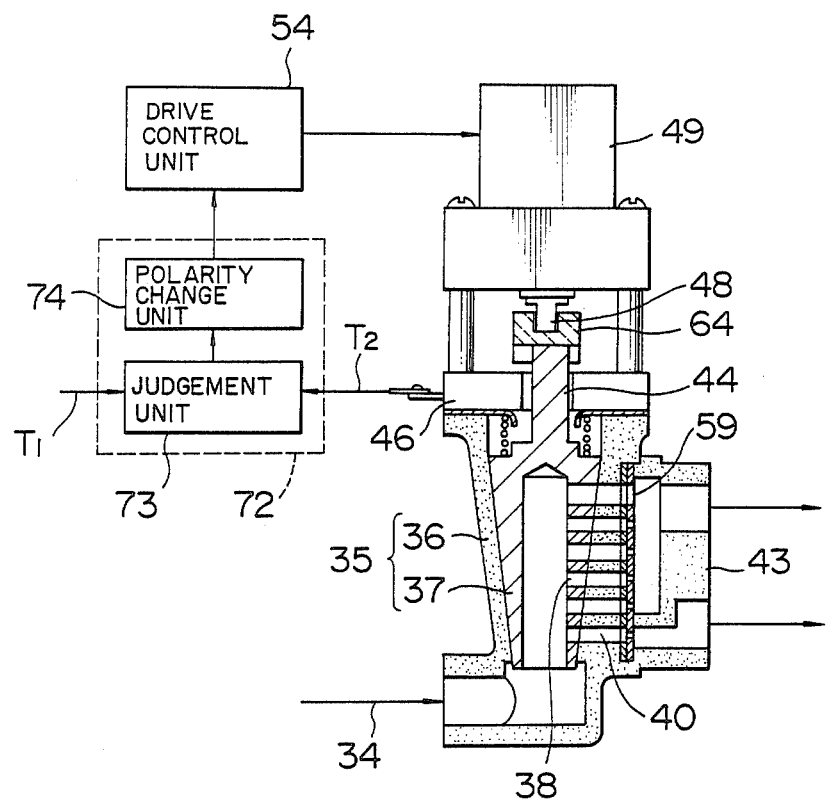
FIG. 31 is a cross section showing a main part of a sixth embodiment of the gas controller according to the present invention.

A sixth embodiment of the present invention is shown in FIG. 31. The gas flow controller comprises a direction selection unit 72 responsive to a present position signal T2 of the cock from the position signal generator 46 and a target position signal T1 for selecting the rotation direction of the enclosing member; and a drive control unit 54 for sending a drive signal representative of the direction selected by the direction selection unit 72 to a motor drive unit 49. The direction selection unit 72 has a judgement unit 73. If the target position signal indicates a completely closed position of the cock, the judgement unit 73 selects the direction that the cock can return to the completely closed position taking the shortest distance. If the target position signal indicates other than the completely closed position, the judgement unit 73 selects the direction that the cock does not take the completely closed position.

Referring to FIG. 31, the position signal generator 46 always monitors a present position including positions where the cock is to be stopped and other intermediate positions where the cock is not to be stopped. When a target position is to be changed due to a need of a change in burning quantity, the direction selection unit 37 determines whether the cock is turned clockwise or counter-clockwise by referencing the present position. Then, the drive control unit 54 actuates the motor drive unit 49 to turn the motor. When the cock reaches the target position, the motor drive unit 49 is disabled. In this case, if the target position is the completely closed position, the shortest distance direction is selected, and if not, the direction that the cock does not take the completely closed position is selected by the direction selection unit 37. As described previously, it takes only a short time to drive the motor drive unit 49, during which the gas burning quantity is to be changed. As a result, heat generation can be neglected and a power source is operated for a short time within its ratings. Thus, it is possible to easily realize a power source of small size and light weight. Apparently, the operating time of the motor drive unit is considerably shorter than the burning time.

The relationship between the output signal pattern of the position signal generator 46 and the burning quantity at each position of the closing member is stored beforehand in the direction selection unit 72. A target position signal to be determined based on the conditions of a burning object or on a start or stop command, and a present position signal are compared with each other to select the rotation direction for the motor drive unit 49. In this case, the judgement unit 73 of the direction selection unit 72 operates in the following manner. If the cock starts moving from the completely closed position, the motor is rotated counter-clockwise when seen in FIG. 24 to first ignite the pilot burner. If the cock is to be rotated to a closed state, then the motor is rotated in the direction that the cock can reach angle (a) by taking a shortest distance. Based on the judgement results, a polarity change unit 74 of the direction selection unit 72 causes the drive control unit 54 to change the polarity of electric power supplied to the motor. The drive control unit 54 operates to turn on and off the motor current or brake the motor rotation.

To avoid explosive ignition of the gas combustion apparatus, an ignition sequence is used wherein first the pilot burner is ignited and thereafter, the main burner is ignited. This sequence can readily be realized through rotation of the enclosing member 37 of this invention. If the enclosing member is erroneously rotated clockwise from the angle (a) (FIG. 24) for ignition of the burner, the position signals at areas P and O can be immediately detected so that an error can be detected by itself.

Since the cock is rotated, upon reception of a stop command, in the direction taking a shortest distance from the present position to the closed position, the slide distance of the cock can advantageously be shortened, thus contributing to improve the durability of the cock having a limited lifetime.

As described so far, the gas flow controller of this embodiment can obtain the same effects described previously, as well as the following effects.

(1) Since the enclosing member is rotated in the direction taking a shortest distance to the closed position to fully stop gas supply, the time from when a need of stopping the gas supply occurs to when the burner is extinguished can be made short. This avoids over-heating an object having a small heat capacity. Particularly, overflowing of the food in a cooking apparatus can be avoided which might be caused by overheating.

(2) In the arrangement of the gas flow controller, the closing member of the cock is rotated. Therefore, a reliability in stopping gas flow is extremely high as compared with electromagnetic valves.

(3) The position signal generator can obtain even those intermediate position signals representative of the positions where the closing member is not to be stopped. Therefore, it can be checked quickly if the enclosing member is being rotated in the direction indicated by the direction selection unit, resulting in the improvement of operating reliability.

Another gist of the first embodiment of the present invention shown in FIGS. 11 to 16 will be described, particularly of the cock 35.

The cock 35 comprises the closing member 36 having a plurality of holes 38 and grooves 39 at the periphery thereof for changing, opening and closing a plurality of passageways 40 through rotation thereof, and a plurality of orifices 41 formed in correspondence with the plurality of passageways 40 corresponding to the holes 38 and grooves 39 of the closing member 36, wherein the circumferential length of each groove 39 is so arranged to be longer than that of groove 39 located away from the shaft 44 of the closing member 36, relative to the former groove.

With the construction as above of this embodiment, a plurality of passageways 40 are changed opened and closed through rotation of the closing member 36. A combination of passageways 40 through which gas flows can be set at a predetermined conditions in accordance with the stop position of the closing member 36. An orifice of different diameter is provided at each passageway 40. Thus, by selecting a desired combination of orifices 41 through which gas flows in accordance with the closing member stop position, it is possible to stepwise change the gas flow from a maximum burning quantity to a minimum burning quantity. Since the reduction ratio is determined based on the orifice diameters, a high reduction ratio can be designed as desired. Also a high precision of gas flow can be ensured since it depends only upon the orifice diameters. Since gas flows through the holes 38 and grooves 39 formed at the periphery of the closing member to the orifices, the structure that gas flow is changed stepwise, e.g., by five steps or six steps, is readily realized. Since the passageway simple in construction is used, a gas flow controller can be mass-produced without difficulty and in a compact size. Further, the circumferential length of each groove 39 of the closing member 36 is so arranged to be longer than that of groove 39 located away from the shaft 44 of the closing member 36, relative to the former groove. Therefore, during a cutting work of the periphery of the closing member 36 whereby the shaft 44 of the closing member is chucked and rotated to cut the periphery with a cutter, a so-called "chattering" which causes irregularly corrugated cut surface is not likely to be caused because the deflection strength of the closing member is high at the vicinity of the shaft 44 of the closing member 36 where only those grooves having a shorter circumferential length are formed. Thus, a stable work precision, for example, of the circularity, straightness and surface roughness of the closing member can be ensured. In accordance with the experiment using a closing member which is cut to have grooves with a longer circumferential length near at the shaft 44, chattering occurred during a cutting work, a stable work precision of the circularity, straightness and surface roughness of the closing member could not be ensured. After assembling the cock using such a closing member, it was reciprocally rotated to make a durability test. According to the test results, the following problems were found at a small number of rotations without attaining a target number of rotations. Namely, partial contact between the cock housing and the closing member occurred due to lack of grease, partial abrasive flaw was found on the slide surfaces between the cock housing and the closing member, and leakage failure was found. In this respect, the closing member with the construction of this embodiment could attain the target number of rotations stably.

As seen from the above description, the gas flow controller of this embodiment can obtain the following effects.

(1) All the holes and grooves for changing, opening and closing a plurality of passageways through rotation of the closing member are formed at the periphery of the closing member. The holes and grooves are adapted to collectively or independently communicate with the orifices. Thus, a gas flow controller can advantageously be realized which has a high precision of gas flow and can be mass-produced with ease and in a small size.

(2) Since the circumferential length of each groove of the closing member is so arranged to become shorter near at the shaft, a stable work precision, for example, of the circularity, straightness and surface roughness of the closing member as well as a prominent operating durability can be ensured.

Another gist of the second embodiment of the present invention shown in FIGS. 19 to 24 will be described, particularly of the cock 35.

The cock 35 comprises the closing member 36 having a plurality of holes 61 and grooves 62 at the periphery thereof for changing, opening and closing a plurality of passageways 40 through rotation thereof; a cock housing 37 having the plurality of passageways 40 in correspondence with the holes 61 and grooves 62 of the closing member; and a plurality of orifices 41 formed in correspondence with the plurality of passageways 40; wherein the guide hole 36a is formed within the closing member in the axial direction thereof, the bottom of the closing member 36 is opened, and the passageway 61a of the closing member corresponding to the orifice 59a having a maximum diameter among the plurality of orifices 59 is disposed at the position where the tapered closing member 36 has a larger diameter than those at the other passageways corresponding to the other orifices.

With the construction as above of this embodiment, a plurality of passageways 60 are changed, opened and closed through rotation of the closing member 36. A combination of passageways 60 through which gas flows can be set at a predetermined conditions in accordance with the stop position of the closing member 36. An orifice 59 of different diameter is provided at each passageway 60. Thus, by selecting a desired combination of orifices 59 through which gas flows in accordance with the closing member stop position, it is possible to stepwise change the gas flow from a maximum burning quantity to a minimum burning quantity. Since the reduction ratio is determined based on the orifice diameters, a high reduction ratio can be designed as desired. Also a high precision of gas flow can be ensured since it depends only upon the orifice diameters. Since gas enters from the guide hole 36a formed within the closing member 36 with the opened bottom in its axial direction and flows through the holes 61 an grooves 62 of the closing member to the orifices 59, the structure that gas flow is changed stepwise, e.g., by five steps or six steps, is readily realized. In addition, since the passageway corresponding to the orifice 59a having a maximum diameter is disposed at the position where the tapered closing member 36 has a larger diameter, a realtively large cross sectional area of a passageway can be obtained in a small size closing member 36. Thus, a low pressure loss in a passageway can be ensured even a small size closing member is used.

As seen from the above description, the gas flow controller of this embodiment can obtain the following effects.

(1) The passageway of the closing member corresponding to the orifice having a maximum diameter is disposed at the position where the tapered closing member has a larger diameter than those at the other passageways corresponding to the other orifices. Therefore, even with the structure capable of changing the gas flow at multi-steps, a gas flow controller can be realized which has a large area of the passageway and a low pressure loss at the passageway, and is compact.

(2) Since the passageway corresponding to the orifice having a maximum diameter is disposed at the position where the closing member has a larger diameter, a design for a multi-step change in gas flow through rotation of the closing member by an equally divided angle can be readily achieved.

(3) Since all the orifices can be formed in a single plate, a mass-production and a change of gas material can be easily realized.

We claim:

1. A gas controller comprising:
   a cock including a closing member and a housing for changing, opening and closing a plurality of passageways;
   a perforated plate having a plurality of orifices corresponding to said plurality of passageways, said perforated plate being provided separately from said cock;
   a motor drive unit for rotating said closing member of said cock;
   a position determining unit including a position signal generator mounted directly on the shaft of said cock and a position judging circuit responsive to a signal from said position signal generator for judging the cock position; and
   a drive control unit responsive to a target position signal and a present position from said position determining unit for sending a drive signal to said motor drive unit.

2. A gas controller according to claim 1, wherein said position signal generator is constructed of an absolute type encoder whereby output signals therefrom assigned to a plurality of cock stop positions and intermediate positions therebetween are gray coded signals relative to a rotary angle.

3. A gas controller according to claim 1, wherein said position signal generator is constructed of an absolute type encoder whereby output signals therefrom are assigned to a plurality of cock stop positions and intermediate positions therebetween, and wherein only the intermediate positions before and after the completely closed position of the cock are divided to assign different output signals thereto.

4. A gas controller according to claim 3, wherein in said position signal generator the division points at the intermediate positions before and after said completely closed position of the cock are set at the position just before a gas passageway is closed while said cock is rotated toward said completely closed position.

5. A gas controller according to claim 1, comprising an operation control unit responsive to a target position signal of said cock and a signal from said position determining unit, a drive control unit responsive to a signal from said operation control unit for sending a signal to said motor drive unit, and a timer unit for outputting a drive stop signal when said motor drive unit is set at a reverse rotation, and after a predetermined time lapse, outputting a reverse signal.

6. A gas controller according to claim 1, comprising an operation control unit responsive to a target position signal of said cock and a signal from said position determining unit, a speed control unit responsive to a signal from said operation control unit for regulating the speed set by said motor drive unit, and a start/stop control unit for starting and stopping the operation of said motor drive unit.

7. A gas controller according to claim 6, wherein said position signal generator stores estimated signals before and after a target position signal, whereby when said estimated signal is detected, said motor drive unit is set at a speed reduction operation by said speed control unit, and when said target position signal is detected, said motor drive unit is set at a stop operation by said start/stop control unit.

8. A gas controller according to claim 7, wherein at the start of actuating said motor drive unit, a maximum power is supplied for a predetermined period irrespective of a position signal at that time.

9. A gas controller according to claim 1, comprising a position signal generator for outputting a signal corresponding to the position of said cock, a position judge unit responsive to said signal for judging the cock position, an operation control unit for storing the order of occurrence of position signals and judging based on a target position signal and a signal from said position judge unit whether a position signal is correct or not, and a drive control unit responsive to a signal from said operation control unit for controlling said motor drive unit.

10. A gas controller according to claim 9, wherein said drive control unit includes a start/stop control unit for starting and stopping the operation of said motor drive unit and stops the operation of said motor drive unit when an abnormal position signal is detected and checks the cock position.

11. A gas controller according to claim 9, wherein said drive control unit includes a start/stop control unit for starting and stopping the operation of said motor drive unit and a speed control unit for setting a speed reduction operation of said motor drive unit, wherein when an abnormal position signal is detected, the speed reduction operation of said motor drive unit is effected to again check the position signal.

12. A gas controller according to claim 1, comprising a direction selection unit resposive to a present position signal from said cock position signal genertor, and a target position signal, for selecting the rotation direction of said cock, and a drive control unit for sending a drive signal representative of the direction selected by said direction selection unit to said motor drive unit, said direction selection unit including a judgement unit, whereby when said target position signal indicates a completely closed position of said cock, a direction taking a shortest distance from a present position to said completely closed position is selected by said judgement unit, and when said target position signal indicates other than said completely closed position, a direction that said cock does not take said completely closed position is selected by said judgement unit.

13. A gas controller according to claim 1, wherein said cock comprises a closing member having a plurality of holes and grooves at the periphery thereof for changing, opening and closing a plurality of passageways through rotation thereof, and a cock housing having said plurality of orifices in correspondence with said holes and grooves, and a plurality of orifices formed in correspondence with said plurality of passageways, wherein the circumferential length of each groove is so arranged to be longer than that of another groove located away from the shaft of said closing member relative to the former groove.

14. A gas controller according to claim 1, wherein said cock comprises a closing member having a plurality of holes and grooves at the periphery thereof for changing, opening and closing a plurality of passageways through rotation thereof; a cock housing having said plurality of passageways in correspondence with the holes and grooves of said closing member; and a plurality of orifices formed in correspondence with said plurality of passageways; wherein a guide hole is formed within said closing member in the axial direction thereof, the bottom of said closing member is opened, and the passageway of said closing member corresponding to the orifice having a maximum diameter among said plurality of orifices is disposed at the position where said tapered closing member has a larger diameter than those at the other passageways corresponding to the other orifices.

* * * * *